Oct. 15, 1940.   I. BENCIVENGA-BARBARO   2,218,079
LEVER PROPULSION DEVICE FOR BICYCLES, ETC
Filed July 7, 1938
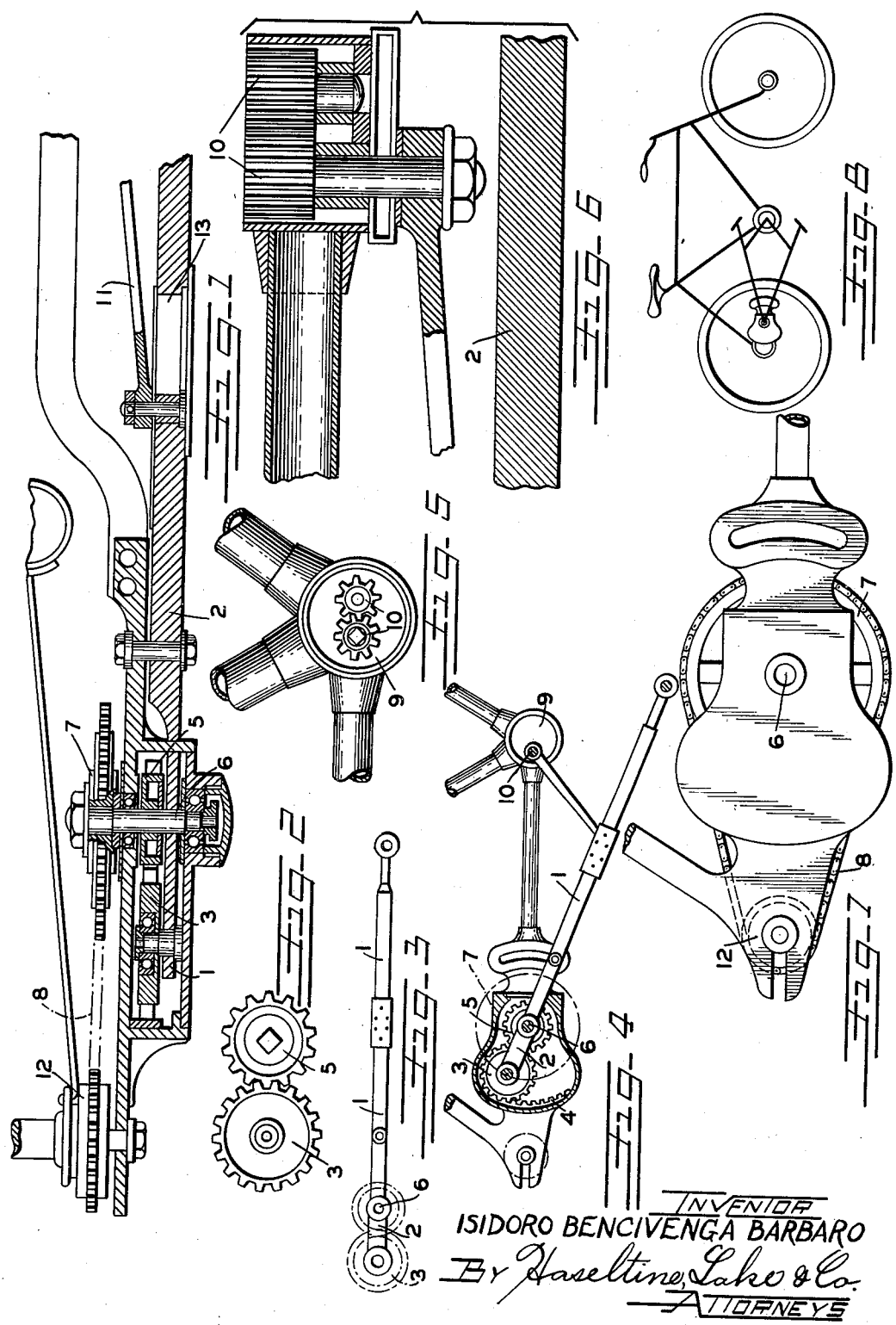
INVENTOR
ISIDORO BENCIVENGA BARBARO
By Haseltine, Lake & Co.
ATTORNEYS Patented Oct. 15, 1940

2,218,079

UNITED STATES PATENT OFFICE 2,218,079

LEVER PROPULSION DEVICE FOR BICYCLES, ETC.

Isidoro Bencivenga-Barbaro, Rome, Italy

Application July 7, 1938, Serial No. 217,887
In Italy July 8, 1937

4 Claims. (Cl. 74—143)

The attempts to substitute the propelling system of bicycles and delivery cycles by a system of levers are well known. So far these attempts have proved fruitless above all owing to the difficulty to mathematically obtain an alternate and continuous movement of the two levers and reduce the resistance in the working of them.

The device embodying this invention overcomes such difficulties and attains the wished-for scope in allowing greater efficiency to one's foot-thrust and, therefore, in lessening the loss of muscular energy.

Such a device is partially applied on each arm of the lower fork, at a short distance from the pinion of the propelling wheel and, partially, in the horizontal tube situated in the lowest place of the frame.

This device consists of a lever with uneven arms, bearing at the end of the longer arm a common pedal and at the other extremity a toothed wheel, unclutched on its own shaft, sliding against a toothed sector falling at the same time into gear with a coupled gear by means of a free wheel mechanism with one only shaft constituting the lever fulcrum. At the end of the shaft is dove-tailed a sprocket which, by means of a short chain, transmits the movement to the pinion of the propelling wheel.

The toothed sector is fitted to a box which covers and supports the sundry elements of the device; the lever, however, remains outside said box almost throughout its length.

Within the horizontal tube, usually containing the central shaft or the pedal shaft, are fitted two gears in mesh with each other, regulating the continuous alternate movement of the levers by means of a little pin which each of them bears dove-tailed on the farthest end of its own shaft and which runs with a gentle sliding movement within a hole made in the long arm of each one of the levers always kept closed and lubricated.

In the accompanying drawing, given by way of example, is shown a form in which this invention can be carried out.

Fig. 1 is a longitudinal section of the lower fork of the box together with the elements of the device and one lever;

Fig. 2 shows the gearing unclutched and the sector engaging gear with the free-wheel gear;

Fig. 3 is a side view of one of the levers;

Fig. 4 is a view of the inside of the box with the lever in the position at its widest opening;

Fig. 5 is a side view of the horizontal tube situated in the lowest point of the frame, showing the two gears for the alternate movement of the levers;

Fig. 6 is a section of the tube containing two gears for the alternate movement of the levers;

Fig. 7 is the outside of the box with the toothed wheel fitted on the pinion of the driving wheel;

Fig. 8 is a scheme of a bicycle with the levers in the position of the largest opening.

The working takes place as follows:

The long arm 1 of each lever being lowered under the pressure of one's foot upon the pedal, starts unclutched wheel 3 carried by the farthest end of the short arm 2 of the lever itself, causing it to slide, on one side, on the toothed sector 4, fitted on the support box, and on the other upon gear 5 coupled with shaft 6 by means of any known free-wheel system. Such a free-wheel or one-way clutch system is shown in Patent No. 611,557 of Brooks, dated September 27, 1898, referring especially to Fig. 4 thereof, but any other practical structure serving the same purpose will be useful for the present purpose. Shaft 6 constitutes as well the fulcrum of lever 1—2 and on its external extremity bears dove-tailed sprocket 7 connected by means of chain 8 to pinion 12 of the driving wheel. The wheel movements 3—5 and 6 are suitably fitted on ball bearings.

When lever 1—2 has covered its trajectory from top to bottom, it easily returns to its former position owing to the action of the two gears 10, by means of crank 11 running within hole 13, compelling one of the levers to rise whilst the other one goes down.

This movement is rendered possible owing to the fact that, as already stated, gear 5 is coupled by a free-wheel mechanism to shaft 6, and such coupling allows of a backward movement of the vehicle independently from the movement of the levers.

This invention allows one to get noteworthy advantages especially in its application to delivery cycles. In fact the greater length of the arms of the levers in comparison to that of the common pedals, increases the efficiency of foot pressure; the less lowering of the extremities of the levers in connection with the pedals allows the rider a lesser effort; the almost vertical trajectory of the levers helps in making full use of all the thrust of one's foot, while the circular trajectory of the pedals makes use of scarcely one fourth more.

The form of execution above described has been given only as an example. It is therefore obvious that the invention can have also other forms to be carried out and of being liable of undergoing such variations which will not go beyond the limits of the invention itself.

What I claim and desire to secure by Letters Patent is:

1. A transmission for the pedaling device of a bicycle, delivery cycle or other vehicle of the type having a driven wheel rotatably mounted on the frame of the vehicle, said transmission comprising a pair of pedal levers pivotally mounted upon both sides of said frame, a drive shaft located at the pivot point of each pedal lever and each of the latter having a long arm bearing a pedal and a short arm carrying a rotatable gear, a one-way clutch mounted upon each drive shaft and bearing a pinion meshing with the respectively adjacent rotatable gear on the pedal lever upon the same side of the vehicle and a fixed rack in mesh with the gear upon each pedal lever, there being means for transmitting the rotation of each drive shaft to the driven wheel.

2. A transmission according to claim 1, wherein the rack is arcuate in form about the axis of the drive shaft upon each side of the vehicle.

3. A transmission according to claim 1, wherein the gear upon the end of the pedal shaft and the pinion with its clutch upon each side of the vehicle are enclosed within a casing fixed to the frame of said vehicle.

4. A transmission according to claim 1, wherein the gear upon the end of the pedal shaft and the pinion with its clutch upon each side of the vehicle are enclosed within a casing fixed to the frame of said vehicle and wherein the rack is arcuate in form about the axis of the drive shaft upon each side of the vehicle and disposed in the rear portion of the casing enclosing the gear and pinion.

ISIDORO BENCIVENGA-BARBARO.